United States Patent [19]

Senatore

[11] Patent Number: 4,605,733

[45] Date of Patent: Aug. 12, 1986

[54] POLYARYLENE SULFIDE PREPARATION METHOD WITH DITHIONITE

[75] Inventor: Guy Senatore, Bartlesville, Okla.

[73] Assignee: Phillips Petroleum Company, Bartlesville, Okla.

[21] Appl. No.: 646,188

[22] Filed: Aug. 31, 1984

[51] Int. Cl.$^4$ ............................................. C08G 75/16
[52] U.S. Cl. .................... 528/388; 524/419; 524/609; 528/381; 528/389
[58] Field of Search ...................... 528/388, 389, 381; 524/419, 609

[56] References Cited

U.S. PATENT DOCUMENTS

| | | | |
|---|---|---|---|
| 4,059,533 | 11/1977 | Watson | 252/8.5 A |
| 4,424,339 | 1/1984 | Idel | 528/388 |
| 4,501,713 | 2/1985 | Wright | 528/388 |

FOREIGN PATENT DOCUMENTS

| | | |
|---|---|---|
| 3205996 | 9/1983 | Fed. Rep. of Germany . |
| 3205994 | 9/1983 | Fed. Rep. of Germany . |

OTHER PUBLICATIONS

Nickless, Inorganic Sulphur Chemistry, 1968, pp. 519–521.
Nordell, Water Treatment, 1961, pp. 104–105, 262.
Betz, Handbook of Industrial Water Conditioning, 1976, pp. 86–89.

*Primary Examiner*—Harold D. Anderson
*Attorney, Agent, or Firm*—French and Doescher

[57] ABSTRACT

A polyarylene sulfide is prepared in a reaction mixture containing a dihaloaromatic compound, a sulfur source, a polar organic compound and an alkali metal or alkaline earth metal dithionite. The presence of dithionite in the reaction mixture enables the production of polymer and products therefrom having a reduced Tmc and enhanced heat stability.

21 Claims, No Drawings

POLYARYLENE SULFIDE PREPARATION METHOD WITH DITHIONITE

BACKGROUND

This invention relates to poly(arylene sulfide)s. It relates to methods for preparing poly(arylene sulfides). In a specific aspect, the invention relates to the production of poly(arylene sulfide)s and products produced therefrom having improved thermal stability.

Polyarylene sulfides are an important class of engineering thermoplastics. The favored commercial process for the production of polyarylene sulfides involves the reaction of an aromatic compound such as dichlorobenzene with a sulfur source such as sodium sulfide in a polar reaction medium such as N-methylpyrrolidone. The polymer produced is resistant to many chemicals and exhibits good thermal stability. However, for the increasing industrial applications of polyarylene sulfide, improved thermal stability is desirable. One application is the use of nonwoven fabrics prepared from polyarylene sulfide fibers as filter bags for industrial smokestacks. For this and similar applications, improved heat stability of the polyarylene sulfide fibers is desirable. For certain applications such as thick films, a polyarylene sulfide having relatively low Tmc is desirable.

It is therefore an object of this invention to provide a method for the preparation of polyarylene sulfides. It is a further object to provide a method for preparing polyarylene sulfides having improved heat stability. In one embodiment, it is an object to produce a polyarylene sulfide fiber or monofilament having improved heat stability. In a further embodiment, it is an object to produce low Tmc polyarylene sulfide.

BRIEF DESCRIPTION OF THE INVENTION

According to the invention, poly(arylene sulfide) is produced in a reaction mixture which includes a dihaloaromatic compound, a sulfur source, a polar organic compound and an alkali metal or alkaline earth metal dithionite. The presence of dithionite in the reaction mixture enables the preparation of polymer and products therefrom having a reduced $T_{mc}$ and enhanced heat stability.

DETAILED DESCRIPTION OF THE INVENTION

The invention method for producing polyarylene sulfides involves a reaction mixture which contains at least one dihaloaromatic compound of the formula

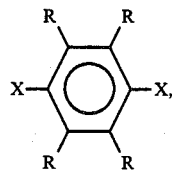

wherein each X is selected from the group consisting of chlorine, bromine and iodine, and each R is selected independently from the group consisting of hydrogen and hydrocarbyl in which the hydrocarbyl can be alkyl, cycloalkyl, aralkyl and the like, with the total number of carbon atoms in each haloaromatic molecule being within the range of 6 to about 24. It will generally be expected that at least about 75 mole percent, preferably about 90 mole percent, and most preferably about 99 mole percent or greater of the haloaromatic compound in the reaction mixture will be such that each R is hydrogen. The preferred such major haloaromatic compound for the reaction is p-dichlorobenzene, because of its availability and the properties of the poly(phenylene sulfide) product.

The reaction mixture may optionally contain a dihaloaromatic compound in which the halogens are attached at ortho or meta positions on the ring, which can be otherwise substituted or unsubstituted as discussed above for the R moiety. Such an ortho- or meta-dihaloaromatic compound will generally be present in the reaction mixture in a minor amount relative to the para-dihaloaromatic compound, usually about 0.001 to about 30 mole percent, preferably about 0.01 to about 3 mole percent, based on total haloaromatic compounds.

The reaction mixture may optionally contain a polyhaloaromatic compound having more than two halogens directly attached to an aromatic ring. Such polyhaloaromatic compound may be further substituted or unsubstituted on the ring as discussed above for the R moiety, and will generally be present in the reaction mixture in a minor amount, compared to the amount of the p-dihaloaromatic compound present. The preferred such polyhaloaromatic compound is a substituted or unsubstituted trihaloaromatic compound, preferably 1,2,4-trichlorobenzene. Such a polyhaloaromatic compound will generally be present in the reaction mixture in an amount of from about 0.001 to about 30 mole percent, based on the total moles of haloaromatic compounds in the reaction mixture, preferably about 0.01 to about 3 mole percent.

The reaction mixture will also contain a sulfur-containing compound which serves as the source of sulfur for the sulfide linkages. Suitable sulfur sources include, for example, alkali metal and alkaline earth metal thiosulfates, substituted and unsubstituted thioureas, thiocarbamates, thiocarbonates, carbon disulfide, carbon oxysulfide, mercaptans, mercaptides, thiomides and sulfides having an alpha or beta activating substituent. Such sulfur sources are generally employed in combination with a base, as discussed below, which will generally be present in the reaction mixture in an amount of about 1 to about 6, preferably about 1.8 to about 4 gram equivalents per gram atom of sulfur in the sulfur source, although one skilled in the art will known that the optimum amount of base will depend upon the specific sulfur source selected. Such sulfur sources and the bases employed are known in the art as disclosed in, for example, U.S. Pat. No. 3,919,177.

The more commonly used and presently preferred sulfur sources are alkali metal bisulfides, alkali metal sulfides and elemental sulfur. The alkali metal bisulfides include anhydrous or hydrated bisulfides of sodium, lithium, potassium, rubidium and cesium. It is generally not necessary to use a base when a bisulfide sulfur source is employed. If no base is added, the alkali metal bisulfide will generally be present in an amount of from about 0.8 to about 1.5 gram-moles per gram-mole of the haloaromatic compound. If a base is added to the reaction mixture, it will generally be employed in an amount of from about 0.3 to about 4, preferably from about 0.4 to about 2, gram-equivalent per gram-mole of alkali metal bisulfide. The preferred bisulfide is sodium bisulfide, NaHS.

The metal sulfides, including monosulfides in anhydrous and hydrated form, can be represented by the formula M₂S where M is selected from the group consisting of sodium, potassium, lithium, rubidium and cesium. The preferred sulfide is sodium sulfide, Na₂S.

Elemental sulfur can be used as the sulfur source. When elemental sulfur is used, a base will generally be added to the reaction mixture in an amount within the range of about 1 to about 5, preferably about 1.5 to about 4, gram equivalents per gram atom of sulfur.

The reaction mixture will also include a polar organic compound such as an organic amide, which is liquid at the reaction temperatures and pressures used. The amides can be cyclic or acyclic and will generally have 1 to about 10 carbon atoms per molecule. Examples of suitable amides include formamide, acetamide, N-methylformamide, N,N-dimethylacetamide, N-ethylpropionamide, N,N-dipropylbutyramide, 2-pyrrolidone, N-methyl-2-pyrrolidone, E-caprolactam, N-methyl-6-caprolactam, N,N'-ethylenedi-2-pyrrolidone, hexamethylphosphoramide, tetramethylurea, and the like. N-methyl-2-pyrrolidone is the preferred organic amide.

Bases which can be employed include lithium hydroxide, sodium hydroxide, potassium hydroxide, rubidium hydroxide, cesium hydroxide, magnesium hydroxide, calcium hydroxide, strontium hydroxide, borium hydroxide, sodium carbonate, potassium carbonate, rubidium carbonate, cesium carbonate, and the like. If desired, the hydroxide can be produced in situ, for example, by the reaction of the corresponding oxide with water.

It is preferable to include in the reaction mixture an alkali metal mono, di or poly carboxylate or other suitable chemical agent to increase the molecular weight of the polyarylene sulfide product. Included in the alkali metal carboxylates which can be employed are those represented by the formula $RCO_2M$ wherein R is a hydrocarbyl radical selected from alkyl, cycloalkyl, and aryl and combinations thereof such as alkylaryl, alkylcycloalkyl, arylalkyl, arylcycloalkyl, and the like, the hydrocarbyl radical having 1 to 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium. If desired, the alkali metal carboxylate can be employed as a hydrate or as a solution or dispersion in water.

Examples of some alkali metal carboxylates which can be employed include lithium acetate, sodium acetate, sodium formate potassium acetate, lithium propionate, sodium propionate, lithium 2-methylpropionate, rubidium butyrate, sodium valerate, cesium hexanoate, lithium heptanoate, lithium 2-methyloctonoate, potassium dodecanoate, sodium octadecanoate, lithium cyclohexanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, and the like, and mixtures thereof. The preferred alkali metal carboxylate is sodium acetate.

The invention process includes adding an alkali metal or alkaline earth metal dithionite to the reaction mixture in the preparation of a poly(arylene sulfide). The dithionite is preferably selected from sodium and lithium dithionite, most preferably sodium dithionite ($Na_2S_2O_4$). It will be present in the reaction mixture in an amount effective to improve a property, such as Tmc or heat stability, of the poly(arylene sulfide) produced. Generally, the dithionite will be present in the reaction mixture in an amount of about 0.0001 moles to about 0.1 moles, preferably about 0.001 to about 0.01 moles, based on moles of donated sulur in the sulfur-containing compound.

The dithionite can be added to the reaction mixture in one or more aliquots at any point, from the initial dehydration stage to the latter stages of the polymeration reaction. It has been found suitable to charge the dithionite to the reaction vessel with the sulfur sources, the base, the alkali metal carboxylate and the polar organic compound for dehydration of this porion of the reaction mixture prior to addition of the dihalobenzene compound. Additional dithionite can be added to the reaction mixture after dehydration or, as desired, during the reaction.

The invention process can produce poly(arylene sulfide) polymer having a reduced temperature of melt crystallization (Tmc), as determined with a differential scanning calorimeter by cooling molten polymer (360° C.) at a rate of 20° C. per minute. For some applications, including the production of certain types of film and fibers, it is desirable for the poly(arylene sulfide) to have a Tmc lower than about 230° C., preferably within the range of about 160° C. to about 200° C.

The properties of the resin produced by the invention process can vary widely depending upon the specific components of the reaction mixture and the reaction conditions. The presently preferred resin for film, fiber and monofilament applications, including biaxially-oriented film, has a melt flow (as determined by modified ASTM D-1238 at 316° C. with an orifice of 0.0825" diameter and 0.315" length and an effective weight of 5.0 Kg including the weight of the piston) of about 30 to about 300 g/10 min, preferably about 30 to about 250 g/10 min, and a Tmc of about 150° C. to about 230° C., preferably about 160° C. to about 200° C. The preferred resin is formed from a reaction mixture comprising about 0.98 to about 1.05 moles of p-dichlorobenzene, about 0 to about 0.005 moles of trichlorobenzene, about 0.9 to about 1.1 moles of sodium hydroxide, about 0.1 moles to about 0.6 moles of sodium acetate, and about 0.001 to about 0.01 moles of sodium dithionite, in sufficient volume of N-methylpyrrolidone (NMP) to serve as a medium for the polymerization reaction, generally about 2 to about 5 moles of NMP, per 1.0 mole of sodium bisulfide.

The resin produced in the invention process is particularly suited for fiber and monofilament applications because of its superior heat stability. Fiber from the resin can be used, for example, in industrial bag filters because of the chemical resistance and heat stability of the polyarylene sulfide.

The conditions of polymerization of polyarylene sulfides are generally known and can vary widely, but will generally include a temperature within the range of about 420° F. to about 600° F., preferably about 435° F. to about 540° F. The reaction time will usually fall within the range of about 1 hour to about 8 hours. The pressure should be sufficient to maintain N-methylpyrrolidone in liquid phase. The polymer can be recovered as desired, preferably by use of a separation agent as in the process disclosed in U.S. Pat. No. 4,415,729.

EXAMPLE I

In this example the preparation of a poly(phenylene sulfide) control resin is described. To a stirred two-gallon autoclave reactor were charged 562.7 g (6.00 moles) NaSH, 254 g (6.35 moles) NaOH pellets, 147.6 g (1.8 moles) sodium acetate, and 1600 cc N-methylpyrrolidone (NMP). The reactor was purged with N$_2$ and heated to about 160° C. with stirring (250 r.p.m.). Dehydration was started, and about 360 cc distillate (H$_2$O and NMP) was collected while the temperature rose to about 200° C.

Then 904.1 g p-dichlorobenzene (DCB) and 325 cc NMP were charged. The reaction mixture was heated at about 235° C./40 psig for about 2 hours. Subsequently the temperature was raised to about 265° C., and the reaction mixture was heated at 265° C./170 psig for 3 hours.

The reaction mixture was allowed to cool to room temperature overnight. The formed grey solid poly(phenylene sulfide) resin was ground in a Waring blender, washed twice with water, and dried in a forced air oven at about 120° C. The total polymer yield was 595 grams. The melt flow (flow rate) of this polymer (labeled Resin 1) was 90.4 g/10 min. (determined according to a modified ASTM D1238 procedure, at 316° C., employing an orifice of 0.0825" diameter and 0.315" length, and an effective weight of 5.0 Kg including the weight of the piston).

The melt crystallization temperature (Tmc; determined on a Perkin-Elmer DSC-2C scanning calorimeter by cooling of the polymer melt starting at 320° C.) of Resin 1 was 216° C.

EXAMPLE II

In this example the preparation of poly(p-phenylene sulfide) resin in accordance with the invention method is described. 562.4 g (6.00 moles) of NaSH, 254.0 g (6.35 moles) of NaOH, 147.6 g (1.80 moles) of sodium acetate, 1600 cc N-methylpyrrolidone (NMP) and 2.09 g (0.012 moles) of Na$_2$S$_2$O$_4$ (sodium dithionite) were charged to a stirred two-gallon reactor. The N$_2$-purged mixture was dehydrated at about 185° C., and 400 cc of distillate was collected.

Then 904 g (6.15 moles) of DCB, 2.09 g (0.012 moles) Na$_2$S$_2$O$_4$ and 325 cc NMP were charged. The reaction mixture was heated and the polymer was recovered in accordance with the procedure described in Example I. The flow rate of this resin (labeled Resin 2) was 113 g/10 min; its Tmc was 193° C. (about 20° C. lower than that of Resin 1).

A second resin (labeled Resin 3) was prepared in accordance with the above-described process; its flow rate was 190 g/10 min.; its Tmc was 207° C. (about 10° C. lower than that of Resin 1).

EXAMPLE III

In this example the extrusion of fibers from the PPS resins and pertinent fiber properties are described. Resins 1, 2 and 3 were vacuum dried, pelletized in a 1" NRM extruder with 250 mesh screen at 180° F. with N$_2$ purge, and then spun into monofilaments in a 1" Wayne Machine and Die Co. extruder at a temperature of about 300° C., at a rate of 1 cc/minute, employing a 20/60/150/325/60/20 mesh screen pack. The gold-colored filaments were wound up at a rate of about 300 feet per minute, and were drawn over a hot plate at about 100° C.

The drawn fibers (draw ratio: about 4x) were then suspended at zero tension in an oven at about 200° C. Fiber properties after various time periods at 200° C. are summarized in Table I.

TABLE I

| Resin | Time (Hrs.) | Denier[1] | Tenacity[2] (gpd) | Elongation[2] (%) | Knot Strength[3] (gpd) |
|---|---|---|---|---|---|
| 1 (Control) | 0 | 26 | 5.0 | 24 | 3.7 |
| | 240 | 30 | 4.7 | 29 | 3.4 |
| | 500 | 27 | 4.6 | 25 | 3.3 |
| | 1210 | 27 | 3.7 | 19 | 3.4 |
| | 1650 | 28 | 3.0 | 12 | 2.4 |
| | 2180 | 29 | 3.0 | 8 | 0.6 |
| 2 (Invention) | 0 | 26 | 4.1 | 22 | 3.9 |
| | 290 | 26 | 4.8 | 23 | 3.4 |
| | 940 | 25 | 4.1 | 21 | 3.3 |
| | 1280 | 28 | 3.5 | 18 | 3.0 |
| | 1680 | 27 | 3.9 | 20 | 3.4 |
| | 2340 | 30 | 2.2 | 10 | 0.6 |
| 3 (Invention) | 0 | 27 | 4.5 | 19 | 3.3 |
| | 290 | 26 | 4.9 | 23 | 4.2 |
| | 940 | 27 | 4.2 | 21 | 3.6 |
| | 1280 | 27 | 4.2 | 22 | 3.3 |
| | 1680 | 27 | 3.6 | 19 | 3.1 |
| | 2340 | 27 | 3.3 | 16 | 0.9 |

[1] weight in grams per 9000 meters
[2] at failure; determined by means of an Instrom 1122 tensile tester; expressed in grams per denier
[3] ultimate fiber strength (at failure) in knot region; expressed in grams per denier.

Data in Table I show that the fibers of resins 2 and 3 retained their high knot strength, elongation and tenacity after heating for about 1650–1700 hours at 200° C., whereas fibers of control resin 1 showed, after heating for about 1650 hours, a decrease of about 35% in knot strength and of about 50% in elongation. These data indicate that resins 2 and 3, prepared with about 0.4 mole-% Na$_2$S$_2$O$_4$ added to the polymerization reaction, exhibited greater thermal stability than the control resin prepared without Na$_2$S$_2$O$_4$.

EXAMPLE IV

This example illustrates additional polymerization runs employing 6.00 moles NaSH, 6.15 moles NaOH, 1.8 moles Na acetate, 1925 cc NMP, 6.18 moles of DCB and 0.024 moles of Na$_2$S$_2$O$_4$, substantially in accordance with the procedure of Example II. Resin 4 was a control run with no added Na$_2$S$_2$O$_4$. Resin 5 was prepared by adding the entire amount of Na$_2$S$_2$O$_4$ (together with NaSH, NaOH, Na acetate and 1600 cc NMP) before dehydration. Resin 6 was prepared by adding the entire amount of Na$_2$S$_2$O$_4$ at the same time when DCB was charged. Resin 7 was prepared in accordance with the procedure described for Resin 2, i.e., 50% of Na$_2$S$_2$O$_4$ was added before dehydration, and 50% was added with DCB.

Resins 4–7 were pelletized, spun and oven-aged essentially in accordance with the procedure described in Example III. Fiber properties and thermal aging results are summarized in Table II and III.

TABLE II

| Resin | Denier | Tenacity (gpd) | Elong. (%) | Knot Strength (gpd) | Color[1] |
|---|---|---|---|---|---|
| 4 (Control) | 28 | 4.3 | 19 | 3.2 | 3 |
| 5 (Invention) | 27 | 4.0 | 23 | 3.6 | 3 |
| 6 (Invention) | 26 | 4.4 | 18 | 3.4 | 1 |
| 7 (Invention) | 27 | 4.1 | 22 | 3.2 | 2 |

[1] Color rating: 1 (lightest), 3 (darkest).

TABLE III

| | Aging at 200° C. | | Aging at 240° C. | | |
|---|---|---|---|---|---|
| Resin | Days to ½ Tenac. | Days to ½ Elong. | Days to ½ Tenac. | Days to ½ elong. | Days to Failure |
| 4 (Control) | 77 | >100 | 26 | 25 | >45 |
| 5 (Invention) | >100 | 98 | 26 | 25 | 45 |
| 6 (Invention) | 94 | 99 | 27 | 25 | 45 |
| 7 (Invention) | >100 | >100 | 18 | 22 | >45 |

Data in Table II show that fibers of the inventive resins had essentially the same physical properties as the central resin fiber but were generally less colored. Table III shows that at 200° C. the inventive resins 5–7 exhibited superior strength retention than control resin 4, whereas at 240° C. no such advantage prevailed.

EXAMPLE V

In this example representative runs for the preparation of PPS, with and without sodium dithionite addition, in a pilot plant reactor are described.

In aqueous sodium sulfide solution was prepared by mixing 72.7 lb of a 50.58 weight-% NaOH solution with 87.2 lb of a solution containing 59.46 weight-% NaHS and 0.49 weight-% Na$_2$S. This solution plus 23.5 lb of sodium acetate, 146 grams (0.32 lb) of Na$_2$S$_2$O$_4$ (dissolved in 600 mL of distilled water) and about 34 gallons of N-methylpyrrolidone (NMP) were added to an agitated pilot plant reactor, which was purged with N$_2$. The mixture was first heated at about 333° F./17 psig for about 25 minutes with stirring. Then the temperature was gradually raised to about 450° F., at 17 psig, and the mixture was allowed to dehydrate for a period of about 90 minutes.

Subsequently 135 lb of 1,4-dichlorobenzene (DCB) and 0.32 lb of Na$_2$S$_2$O$_4$ (dissolved in 600 mL H$_2$O) were added to the dehydrated reaction mixture. The entire mixture was stirred and heated for about 2 hours at about 450° F. (pressure 30–73 psig), and then, after a heating-up period of 25 minutes, for about 1 hour at 510° F. (pressure: 154–167 psig). Then 153 g of 1,2,4-trichlorobenzene (TCB) and 2 gallons of NMP were added, and the reaction mixture was heated at about 510° C. for additional 2 hours.

The reactor contents were cooled at a rate of about 2° F. per minute. When a temperature of 275° F. (17 psig) was attained, 10 gallons of cold water were added. After the temperature had dropped to about 225° F., the entire reactor contents were transferred to a dilution tank containing about 50 gallons of city water.

The slurry was filtered through a 200 porosity filter cloth in a Straight Line belt filtration unit. The PPS filter cake was resurried with about 120 gallons of cold water and filtered. The PPS was washed with about 80 gallons of hot water (350° F.) containing about 220 grams of CaCl$_2$ and finally with about 80 gallons of hot water (350° F.). The PPS resin, labeled Resin 8, was dried. It had a flow rate of 67 g/10 min, and an ash content of 0.43 weight-%. Na content was 35 ppm; Ca content was 1148 ppm.

A control resin, labeled Resin 9, was prepared essentially in accordance with the above-described procedure of this example, except that no Na$_2$S$_2$O$_4$ was added. The melt flow of this resin was 113 g/10 min; and the ash content was 0.45 weight-%. Na content was 48 ppm; Ca content was 1192 ppm.

EXAMPLE VI

This example illustrates the use of the resin of Example V in film applications. Resins 8 and 9 were pelletized on a 1½″ D-S extruder at a die temperature of 610°–620° F. and a melt pressure of 1000–1100 psi. PPS pellets were dried overnight in a vacuum oven at about 110° C. and were extruded through a slot die (10 mils×3 inch) at a die temperature of about 515° F.

The extruded sheets made from Resins 8 and 9 were stretched 3.0 x in one direction and 3.2–3.5 x in the perpendicular direction, and were then heatset at 275° C. for 90 minutes. Physical properties of several samples of biaxially oriented films (thickness: 0.03–0.05 mm) are listed in Table IV.

TABLE IV

| | Tensile Strength (MPa) | | Elongation (%) | Haze[1] | Density (g/cc) | (g)[2] |
|---|---|---|---|---|---|---|
| Resin | At Yield | At Break | | | | |
| 8 (Invention) | 95 | 111 | 34 | 10.4 | 1.365 | 9.7 |
| | 100 | 127 | 63 | | | 9.1 |
| 9 (Control) | 94 | 129 | 55 | 7.1 | 1.367 | 9.6 |
| | 100 | 132 | 49 | | | 8.7 |

[1]Measured by means of a Hunter-Lab D55H hazemeter, using films of approximately 1.5 mil thickness.
[2]Elmendorf tear resistance measured by means of an Elmendorf Model 60-2 Tear Tester using films of 1.4 mil thickness.

Data in Table IV show that properties of invention and control resin films are comparable. The film sample of invention resin 8 was slightly more hazy (opaque) than the control film.

I claim:

1. A method for the preparation of a poly(arylene sulfide) comprising:
    contacting in a reaction mixture a dihaloaromatic compound, a sulfur-containing compound, a polar organic compound, and an alkali metal or alkaline earth metal dithionite, under suitable polymerization conditions for the formation of the poly(arylene sulfide), said sulfur-containing compound being selected from the group consisting of elemental sulfur, alkali metal sulfides, alkali metal bisulfides, alkali metal and alkaline earth metal thiosulfates, substituted and unsubstituted thioureas, thiocarbamates, thiocarbonates, carbon disulfide, carbon oxysulfide, mercaptans, mercaptides, thiomides and sulfides having an alpha or beta activating substituent.

2. The method of claim 1 in which the dihaloaromatic compound is p-dichlorobenzene and the polar organic compound is N-methylpyrrolidone.

3. The method of claim 2 in which the reaction mixture further comprises a chemical agent for increasing the molecular weight of the poly(arylene sulfide).

4. The method of claim 3 in which the chemical agent is an alkali metal carboxylate.

5. The method of claim 4 in which the sulfur-containing compound is selected from the group consisting of elemental sulfur, alkali metal sulfides and alkali metal bisulfides.

6. The method of claim 5 in which the reaction mixture further comprises a base.

7. The method of claim 6 in which the reaction mixture further comprises a trihaloaromatic compound.

8. The method of claim 2 which further comprises recovering solid poly(arylene sulfide) having a Tmc lower than about 230° C.

9. The method of claim 2 in which the dithionite is sodium dithionite present in an amount effective to reduce the Tmc of the poly(arylene sulfide).

10. The method of claim 2 in which the dithionite is sodium dithionite present in an amount within the range of about 0.0001 to about 0.1 moles, per mole of the sulfur compound.

11. The method of claim 4 in which the dithionite is sodium dithionite, the alkali metal carboxylate is sodium acetate, the sulfur-containing compound is sodium bisulfide, the dihaloaromatic compound is p-dichlorobenzene, and the polar organic compound is N-methylpyrrolidone.

12. The method of claim 4 which further comprises recovering solid poly(phenylene sulfide) having a Tmc within the range of about 160° C. to about 200° C. and a melt flow within the range of about 30 to about 150 g/10 min.

13. The method of claim 12 which further comprises forming the recovered poly(arylene sulfide) into a film.

14. The method of claim 12 which further comprises extruding a filament from the recovered poly(arylene sulfide).

15. The method of claim 1 in which the dihaloaromatic compound is represented by the formula

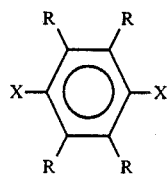

wherein each X is selected from the group consisting of chlorine, bromine and iodine, and each R is selected independently from the group consisting of hydrogen and hydrocarbyl in which the hydrocarbyl is alkyl, cycloalkyl or aralkyl, with the total number of carbon atoms in each haloaromatic molecule being within the range of 6 to about 24.

16. The method of claim 1 in which the polar organic compound is an organic amide, said amide being generally cyclic or acyclic and containing from 1 to about 10 carbon atoms per molecule.

17. A method for producing poly(arylene sulfide) having a Tmc of less than about 230° C. from a reaction mixture comprising at least one haloaromatic compound, at least about 90 mole percent of which is p-dihalobenzene, a sulfur-containing compound selected from sulfur, alkali metal sulfide and alkali metal bisulfide, and a polar organic compound, the method comprising including in the reaction mixture an alkali metal or alkaline earth dithionite.

18. The method of claim 17 in which the dithionite is sodium dithionite present in an amount of from about 0.0001 to about 0.1 moles per mole of the sulfur-containing compound.

19. The method of claim 18 which further comprises recovering and washing solid poly(arylene sulfide) and forming the solid poly(arylene sulfide) into a film.

20. A method comprising extruding the poly(arylene sulfide) prepared by the method of claim 17.

21. A method comprising forming a filament of the poly(arylene sulfide) prepared by the method of claim 17.

* * * * *